June 16, 1925.
A. S. PIERREL
PACKING RING
Filed April 4, 1921
1,542,170
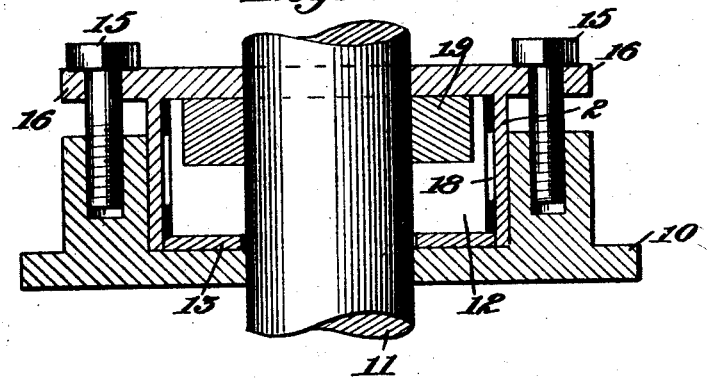
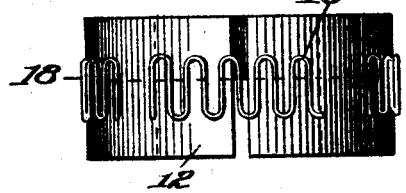
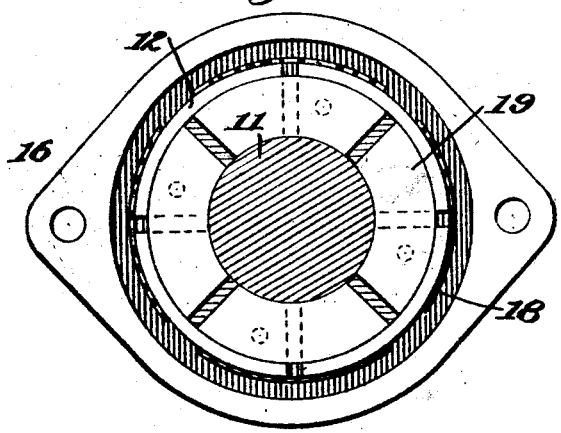
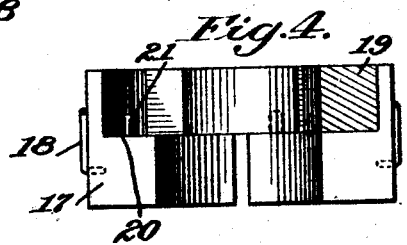
Inventor:
A. S. Pierrel,
by Cushman, Orgeant Darby
Att'ys.

Patented June 16, 1925.

1,542,170

UNITED STATES PATENT OFFICE.

ANTHONY S. PIERREL, OF WASHINGTON, LOUISIANA.

PACKING RING.

Application filed April 4, 1921. Serial No. 458,281.

*To all whom it may concern:*

Be it known that I, ANTHONY S. PIERREL, a citizen of the United States, residing at Washington, in the parish of Saint Landry and State of Louisiana, have invented new and useful Improvements in Packing Rings, of which the following is a specification.

This invention relates to a packing ring construction, and more particularly, though not exclusively, to a metallic packing ring intended for use in connection with piston rods and other reciprocating or rotating parts of machinery for the purpose of preventing leakage of steam and the like.

An object of the invention is to provide a packing ring which automatically contracts and expands in order to compensate for wear, and which at the same time very effectively prevents leakage of the steam.

Another object of the invention is to provide a packing ring which, in contracting and expanding, will always maintain its original annular shape and will expand equally in all radial directions.

A still further object of the invention is the provision of a packing ring which comprises a plurality of removable sections which are replaceable after the ring has been subjected to considerable wear.

Other objects of a more minute character will become obvious as the description proceeds and reside in more specific details of construction which can be more clearly explained by describing one embodiment of the invention, such as is shown in the accompanying drawings, wherein:

Figure 1 is a cross sectional view showing the packing ring applied to a piston rod.

Figure 2 is a top plan of the construction shown in Figure 1 with a portion of the packing box removed.

Figure 3 is a side elevational view of the ring, and

Figure 4 is a cross sectional view of the packing ring removed from the cage.

Referring more particularly to Figure 1, 10 indicates a cylinder head having extending therethrough the usual piston rod 11 which is surrounded by the packing ring 12 resting upon the gasket 13 and is enclosed in a cage 14 secured to the cylinder head, as by means of bolts 15 extending through ears 16 into the cylinder head.

The packing ring comprises an annular outer section formed of a plurality of segments 17, substantially L-shaped in cross section, having their adjacent ends slightly spaced apart and yieldingly held in position by wire springs 18 connected at opposite ends to the adjoining sections. It will be noted that each spring is anchored at its ends in the adjacent segments and comprises a length of spring wire bent to form a plurality of U-sections. The springs of this construction fit snugly against the peripheral surfaces of the segments, and serve to hold them against movement either toward or from one another, and the yielding connection between the adjacent ends, being made by separate springs, permits equal expansion and contraction of the outer section at the several joints spaced circumferentially of the ring. Thus, when there occurs an expansion or contraction the ring retains its annular shape. In many constructions heretofore employed, this expansion and contraction takes place at only one point resulting in an alteration in the shape of the ring. It will also be observed that the adjacent outer section segments have juxtaposed ends which are overlapped by the segments of an inner annular ring section, which is formed of a plurality of segments 19. Each of the segments 19 is removably mounted upon and secured to an outer section segment, as by means of pins 20 upon the outer section segments extending into recesses 21 in the under face of each inner section segment.

Each inner section segment is secured to an outer section segment and overlaps the joint between the supporting segment and an adjacent outer section segment, as will be obvious from an inspection of Figure 2.

It should be understood that while but a single one of these rings is shown as employed in the construction shown in Figures 1 and 2, a plurality of the rings might readily be used by supplying a type of cage intended to enclose several rings. However, due to the construction hereinbefore described, it will generally be found that a single ring is entirely adequate. As the ring wears, it will contract under the tension of the springs 18 and, when desirable, the inner section segments 19 may be removed and new segments substituted.

Obviously, numerous modifications may be made in the illustrated device without departing from the scope of the invention.

What I claim is:

A packing ring comprising an outer annular section formed of a plurality of segments substantially L-shaped in cross section, the adjacent ends of said segments being slightly spaced and juxtaposed, an inner annular section formed of a plurality of segments with their ends juxtaposed, each of said inner section segments being mounted upon and secured to an outer section segment and overlapping the joint between the supporting section and an adjacent outer section segment, the means for securing together the outer section and the inner section segments comprising a pin upon the segment of one of the sections projecting into a recess in the other section segment, and separate wire springs, each having a plurality of U-sections therein, joining the adjacent ends of the segments of said outer section, each spring having its ends anchored in adjacent segments and serving to hold said segments against relative movement both toward and from one another, the lengths of said springs between the bends paralleling the peripheral surface of the segments.

In testimony whereof I have hereunto set my hand.

ANTHONY S. PIERREL.